(12) United States Patent
Lee et al.

(10) Patent No.: US 12,478,522 B2
(45) Date of Patent: Nov. 25, 2025

(54) SYSTEM FOR BOARDING A WHEELCHAIR ON A VEHICLE

(71) Applicant: GM GLOBAL TECHNOLOGY OPERATIONS LLC, Detroit, MI (US)

(72) Inventors: Jaeyun Lee, Incheon (KR); Bongbum Back, Incheon (KR); Junetaek Lee, Ganghwa-gun (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 339 days.

(21) Appl. No.: 18/308,752

(22) Filed: Apr. 28, 2023

(65) Prior Publication Data
US 2024/0359612 A1    Oct. 31, 2024

(51) Int. Cl.
*A61G 3/06*    (2006.01)
*B60P 1/44*    (2006.01)

(52) U.S. Cl.
CPC ............ *A61G 3/062* (2013.01); *B60P 1/4435* (2013.01); *B60P 1/4442* (2013.01); *B60P 1/4471* (2013.01); *Y10S 414/134* (2013.01)

(58) Field of Classification Search
CPC ...... A61G 3/062; B60P 1/4414; B60P 1/4435; B60P 1/4442; B60P 1/4471
USPC ................................................. 414/522, 541
See application file for complete search history.

(56) References Cited

U.S. PATENT DOCUMENTS

| | | | | |
|---|---|---|---|---|
| 2,676,720 | A * | 4/1954 | Noble | B60P 1/4414 414/467 |
| 3,006,487 | A * | 10/1961 | Gelli | B60R 5/04 414/522 |
| 4,083,429 | A * | 4/1978 | Abbott | A61G 3/062 414/541 |
| 4,671,730 | A * | 6/1987 | Gateau | A61G 3/062 414/921 |
| 4,778,328 | A * | 10/1988 | Apgar | B60P 1/4442 414/921 |
| 4,958,979 | A * | 9/1990 | Svensson | B60P 1/4435 414/921 |
| 5,346,355 | A * | 9/1994 | Riemer | B60P 1/4435 414/522 |
| 6,965,819 | B2 * | 11/2005 | Schafer | A61G 3/062 701/36 |
| 7,798,761 | B2 * | 9/2010 | Goodrich | A61G 3/062 414/921 |
| 8,113,760 | B1 * | 2/2012 | Schroll | A61G 3/062 414/921 |

(Continued)

FOREIGN PATENT DOCUMENTS

| | | | | | |
|---|---|---|---|---|---|
| CN | 113415226 | A | * | 9/2021 | ............. A61G 3/062 |
| JP | 57186541 | A | * | 11/1982 | ............. A61G 3/062 |

*Primary Examiner* — James Keenan
(74) *Attorney, Agent, or Firm* — CANTOR COLBURN LLP (57) ABSTRACT

A system for boarding a wheelchair on a vehicle is provided. The system includes a pair of tracks affixed to an interior of the vehicle, a panel slidably disposed on the pair of tracks, and a scissor lift mechanism having a first end affixed to the panel. The system also includes a platform configured for receiving the wheelchair, the platform affixed to a second end of the scissor lift mechanism, a first actuator configured to move the panel along the pair of tracks, and a second actuator configured to operate the scissor lift mechanism.

20 Claims, 8 Drawing Sheets

(56) References Cited

U.S. PATENT DOCUMENTS

| | | | | |
|---|---|---|---|---|
| 8,956,102 B2* | 2/2015 | Alasfour | ................ | A61G 3/062 |
| | | | | 414/541 |
| 2007/0020075 A1* | 1/2007 | Kelly | .................... | B60P 1/4414 |
| | | | | 414/540 |
| 2010/0329831 A1* | 12/2010 | Tornese | ................ | B60P 1/4435 |
| | | | | 414/544 |
| 2011/0280700 A1* | 11/2011 | Uttech | ................... | A61G 3/062 |
| | | | | 414/540 |

* cited by examiner

SYSTEM FOR BOARDING A WHEELCHAIR ON A VEHICLE

INTRODUCTION

The disclosure relates to a system for boarding a wheelchair on a vehicle. More specifically, the disclosure relates to a vehicle having a scissor lift that is configured to receive a wheelchair.

Motor vehicles are often outfitted with systems for loading a wheelchair into the vehicle. In large vehicles, such as vans or full-size sports utility vehicles, this system can be disposed inside of the vehicles. However, with smaller vehicles, these systems are often externally mounted to the vehicle due to space constraints. Recent advances in wheelchair technologies have resulted in advanced motorized wheelchairs that are configured to collapse into a smaller form factor when not in use.

SUMMARY

In one exemplary embodiment, a system for boarding a wheelchair on a vehicle is provided. The system includes a pair of tracks affixed to the interior of the vehicle, a panel slidably disposed on the pair of tracks, and a scissor lift mechanism having a first end affixed to the panel. The system also includes a platform configured for receiving the wheelchair, the platform affixed to a second end of the scissor lift mechanism, a first actuator configured to move the panel along the pair of tracks, and a second actuator configured to operate the scissor lift mechanism.

In addition to the one or more features described herein, the system further includes a controller configured to operate the first actuator and the second actuator based at least in part on a user command.

In addition to the one or more features described herein, the panel includes one or more wheels and wherein each of the pair of tracks includes a channel that is configured to receive the one or more wheels.

In addition to the one or more features described herein, the first end of the scissor lift mechanism and the second end of the scissor lift mechanism include a fixed attachment point and a slidable attachment point.

In addition to the one or more features described herein, the second actuator is a linear actuator.

In addition to the one or more features described herein, a first end of the linear actuator is affixed to the panel and a second end of the linear actuator is affixed to a cross member of the scissor lift mechanism.

In addition to the one or more features described herein, the first actuator is a rotary actuator.

In addition to the one or more features described herein, the first actuator is affixed to a gear that is configured to rotate a rod, the rod having gears disposed on each end.

In addition to the one or more features described herein, the system also includes one or more sensors configured to monitor one or more of a position of a door of the vehicle corresponding to the system, a relative position of the panel and the pair of tracks, and a relative position of the panel and the platform.

In addition to the one or more features described herein, the controller is further configured to operate the first actuator and the second actuator based at least in part on data received from the one or more sensors.

In one exemplary embodiment, a vehicle is provided. The vehicle includes a door and a wheelchair lift disposed in an interior of the vehicle adjacent to the door. The wheelchair lift includes a pair of tracks affixed to the interior of the vehicle, a panel slidably disposed on the pair of tracks, and a scissor lift mechanism having a first end affixed to the panel. The wheelchair lift also includes a platform configured for receiving a wheelchair, the platform affixed to a second end of the scissor lift mechanism, a first actuator configured to move the panel along the pair of tracks, and a second actuator configured to operate the scissor lift mechanism.

In addition to the one or more features described herein, the pair of tracks are oriented perpendicular to the door in a closed position.

In addition to the one or more features described herein the vehicle also includes controller configured to operate the first actuator and the second actuator based at least in part on a user command.

In addition to the one or more features described herein, the vehicle also includes one or more sensors configured to monitor one or more of a position of the door of the vehicle, a relative position of the panel and the pair of tracks, and a relative position of the panel and the platform.

In addition to the one or more features described herein, the controller is further configured to operate the first actuator and the second actuator based at least in part on data received from the one or more sensors.

In addition to the one or more features described herein, the second actuator is a linear actuator.

In addition to the one or more features described herein, a first end of the linear actuator is affixed to the panel and a second end of the linear actuator is affixed to a cross member of the scissor lift mechanism.

In addition to the one or more features described herein, the actuator is configured to extend the panel outside of the interior of the vehicle.

In addition to the one or more features described herein, the panel includes one or more wheels and wherein each of the pair of tracks includes a channel that is configured to receive the one or more wheels.

In one exemplary embodiment, a vehicle is provided. The vehicle includes a door and a wheelchair lift disposed in the interior of the vehicle adjacent to the door. The wheelchair lift includes a pair of tracks affixed to the interior of the vehicle, a panel slidably disposed on the pair of tracks, and a scissor lift mechanism having a first end affixed to the panel. The wheelchair lift also includes a platform configured for receiving a wheelchair, the platform affixed to a second end of the scissor lift mechanism, a rotary actuator configured to move the panel along the pair of tracks, and a linear actuator configured to operate the scissor lift mechanism. The wheelchair lift further includes one or more sensors configured to monitor one or more of a position of the door, a relative position of the panel and the pair of tracks, and a relative position of the panel and the platform and a controller configured to operate the linear actuator and the rotary actuator based at least in part on a user command and data received from the one or more sensors.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description.

DETAILED DESCRIPTION

The following description is merely exemplary in nature and is not intended to limit the present disclosure, its application, or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Turning now to an overview of the aspects of the disclosure, embodiments of the disclosure include systems and methods for boarding and offloading a wheelchair onto a vehicle. In exemplary embodiments, a wheelchair lift system is provided that includes a pair of tracks affixed to the interior surface of the vehicle. The wheelchair lift system also includes a panel slidably disposed on the pair of tracks and a scissor lift mechanism. The scissor lift mechanism is affixed to the panel and to a platform that is configured for receiving the wheelchair. The wheelchair lift system also includes a first actuator configured to move the panel along the pair of tracks and a second actuator configured to operate the scissor lift mechanism. In exemplary embodiments, the wheelchair lift system includes a controller that is configured to selectively activate the first and second actuators to cause the platform to receive and store the wheelchair inside of the vehicle.

Figure 1:
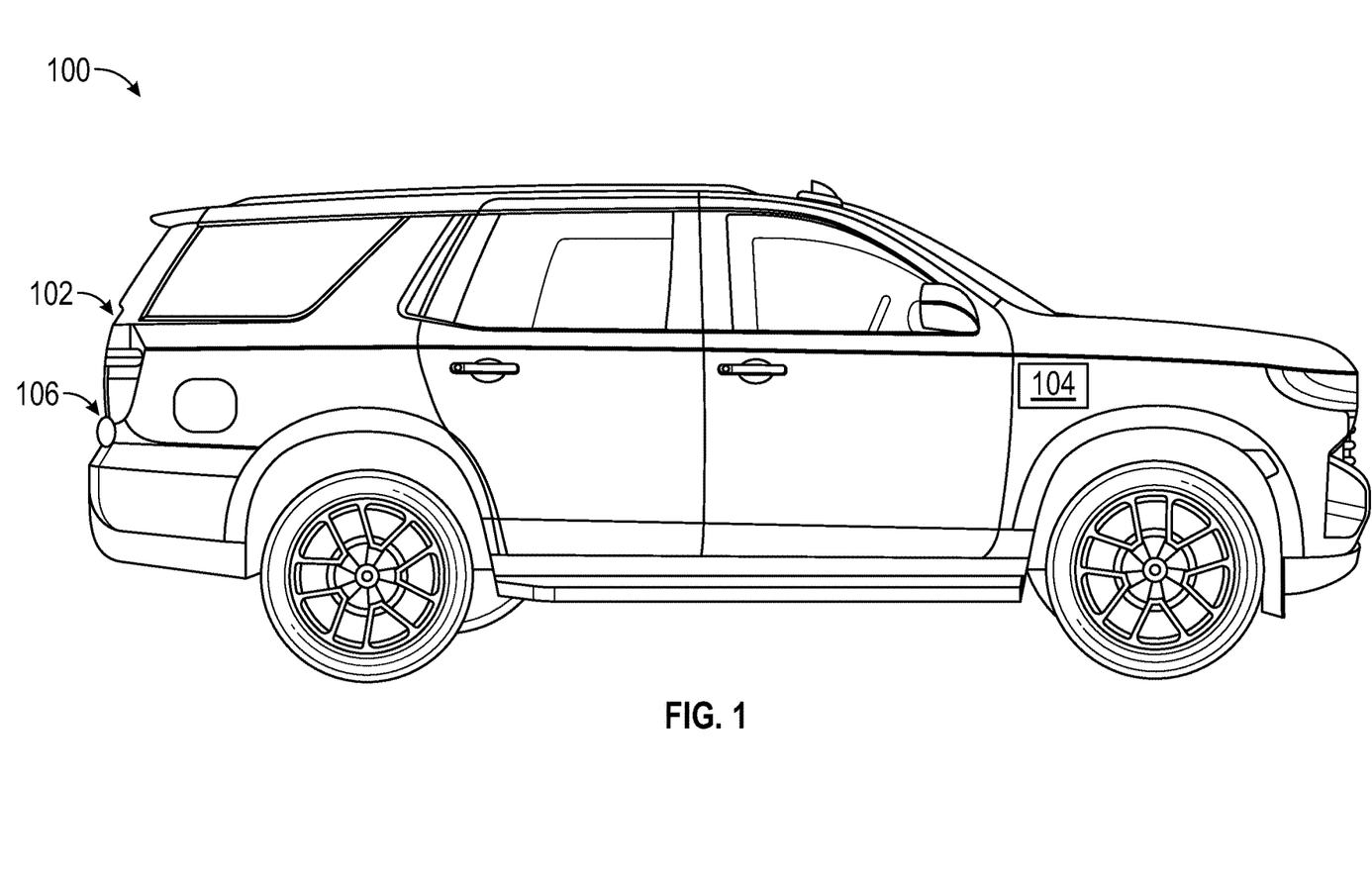
FIG. 1 is a schematic diagram of a vehicle in accordance with an exemplary embodiment.

Referring now to FIG. 1, a schematic diagram of a vehicle 100 in accordance with an exemplary embodiment is shown. In exemplary embodiments, the vehicle 100 includes a controller 104 and one or more sensors 106. In exemplary embodiments, the controller 104 is one of a general-purpose processor, a Field Programmable Gate Array (FPGA), an application-specific integrated circuit (ASIC), or the like. The controller 104 is configured to monitor the sensors 106. The sensors 106 are configured to monitor a condition of vehicle 100, including whether a door 102 of the vehicle 100 is in an open or closed position.

Figure 2A:
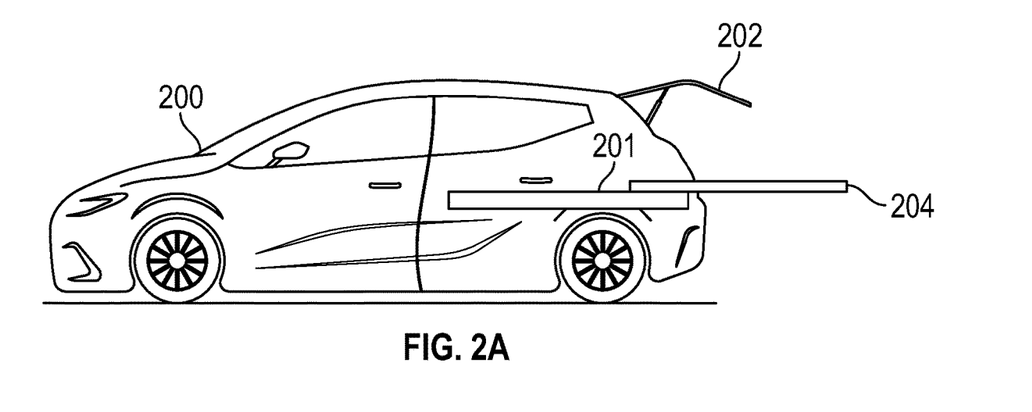
FIGS. 2A, 2B, 2C, and 2D are schematic diagrams illustrating the operation of a system for boarding a wheelchair on a vehicle in accordance with an exemplary embodiment.

Referring now to FIGS. 2A, 2B, 2C, and 2D, schematic diagrams illustrating the operation of a system for boarding a wheelchair 210 on a vehicle 200 in accordance with an exemplary embodiment are shown. As best shown in FIG. 2A, the vehicle 200 includes one or more rails 201 that are affixed to an interior surface of the vehicle 200. In exemplary embodiments, the rails 201 are oriented in a direction that is perpendicular to the door 202 when the door 202 is in the closed position. The vehicle 200 also includes a panel 204 that is slidably disposed on the rails 201. In exemplary embodiments, the panel 204 is configured to extend, at least partially, outside of the interior of the vehicle 200 through an opening created by the door 202 of the vehicle 200 when the door 202 is in the open position.

Figure 2B:
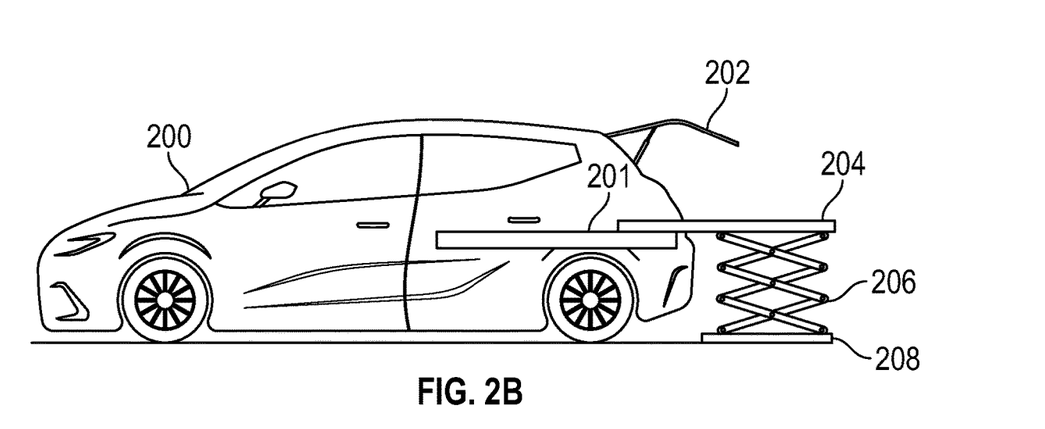
Figure 2C:
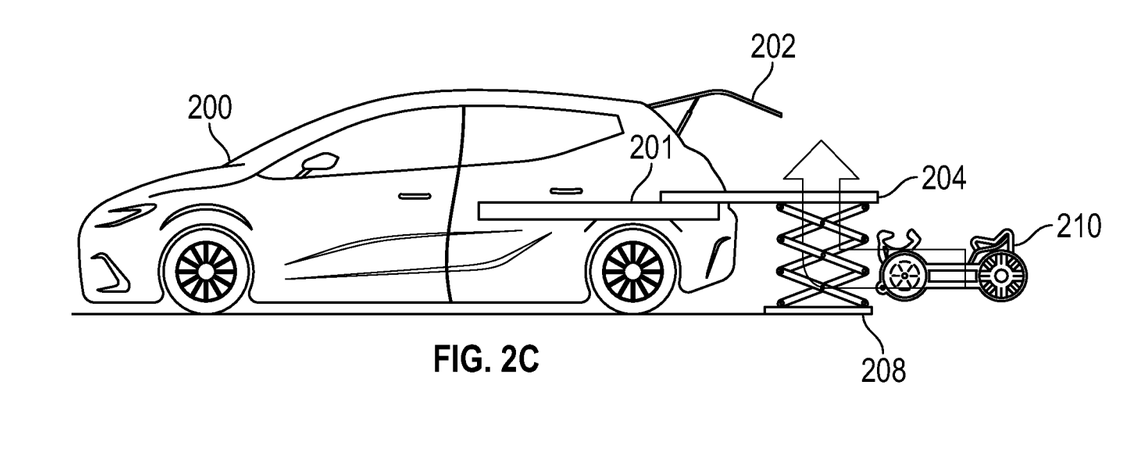
Figure 2D:
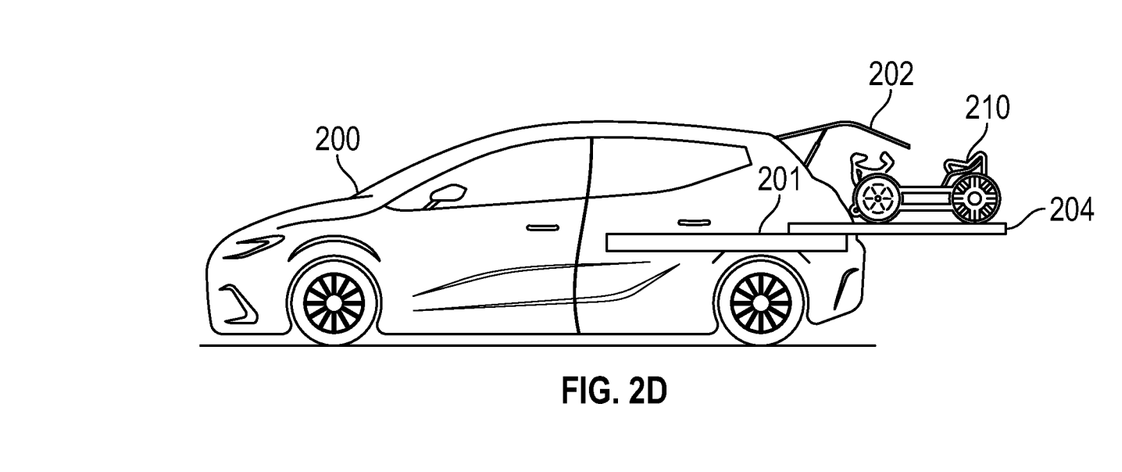

As shown in FIG. 2B, once the panel 204 is extended out of the door 202, a scissor lift mechanism 206 affixed to the panel is configured to extend towards the ground and lower a platform 208, which is also affixed to the scissor lift mechanism 206. Next, as best shown in FIG. 2C, once the platform 208 has been lowered to ground level, a wheelchair 210 can be loaded onto the platform 208. The scissor lift mechanism 206 is then used to lift the platform 208, and the wheelchair 210, into a position shown in FIG. 2D. Finally, the panel 204 is retracted into the vehicle 200 and the door 202 is closed, thereby storing the wheelchair 210 inside of the vehicle 200. In exemplary embodiments, the process shown in FIGS. 2A, 2B, 2C, and 2D can be performed in reverse order to offload the wheelchair 210 from the vehicle 200.

Figure 3A:
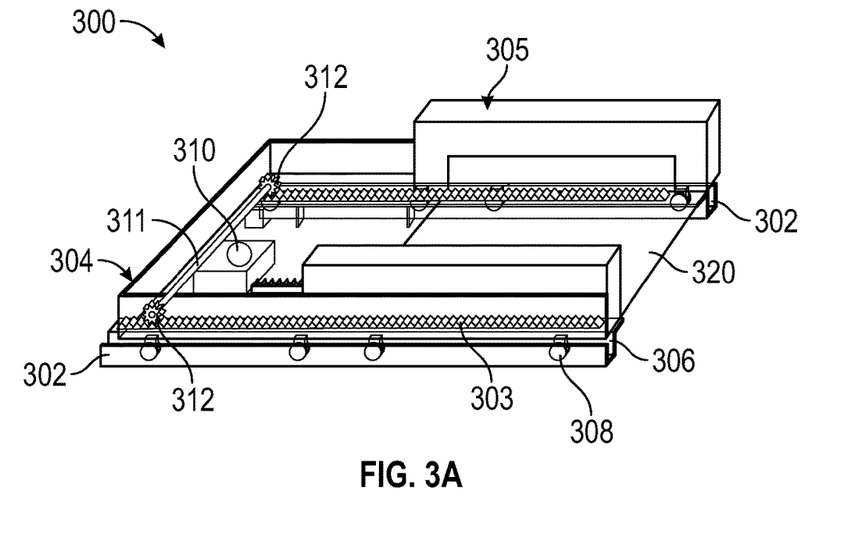
FIGS. 3A, 3B, and 3C are schematic diagrams illustrating the operation of a wheelchair lift system for a vehicle in accordance with an exemplary embodiment.
Figure 3B:
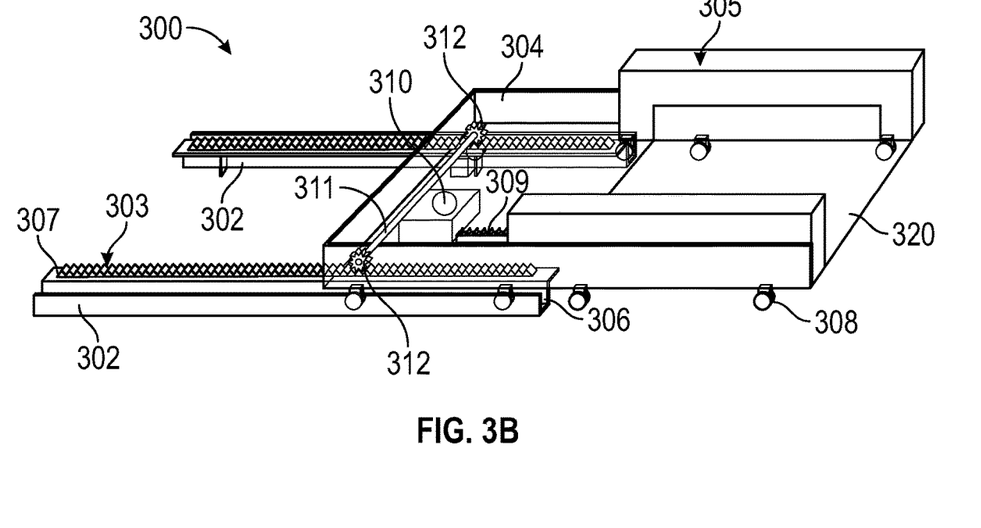
Figures 3C, 3D:
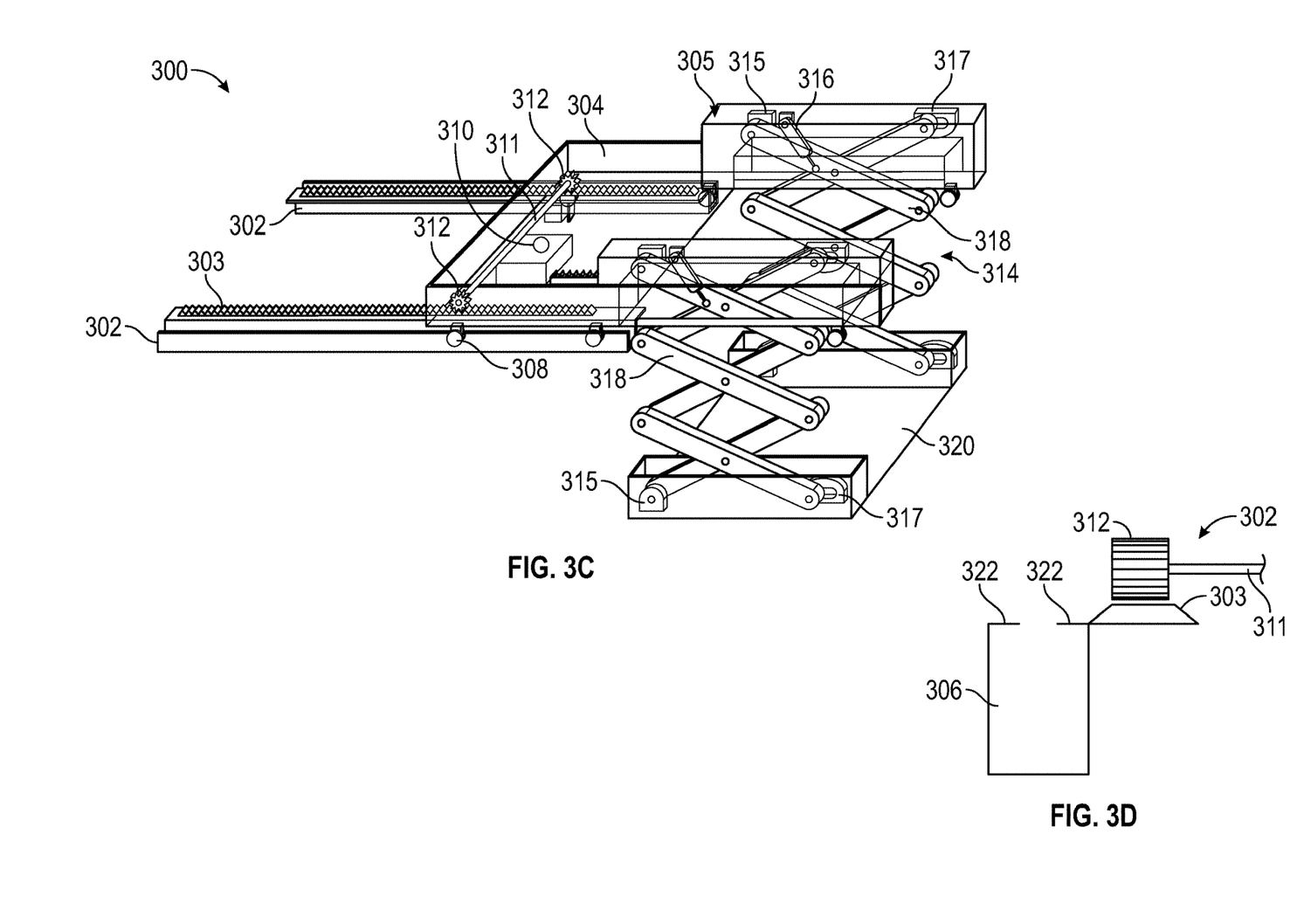
FIG. 3D is a schematic diagram illustrating a cross-sectional view of one of the tracks of the wheelchair lift system in accordance with an exemplary embodiment.

Referring now to FIGS. 3A, 3B, and 3C, schematic diagrams illustrating the operation of wheelchair lift system 300 for a vehicle in accordance with an exemplary embodiment are shown. The wheelchair lift system 300 includes a pair of tracks 302 that are configured to be affixed to an interior surface of a vehicle. The wheelchair lift system 300 also includes a panel 304 that is slidably disposed on the pair of tracks 302. The panel 304 includes a plurality of wheels 308 disposed on the bottom of the panel 304. Each track 302 includes a channel 306 that is configured to receive the wheels 308 of the panel 304.

In exemplary embodiments, the panel 304 includes a first actuator 310 that is configured to move the panel 304 with respect to the tracks 302. In one embodiment, the first actuator 310 is a rotary actuator that is configured to rotate a rod 311 using a spur gear. The rod 311 includes a gear 312 disposed on each end of the rod 311. The gears 312 are configured to interact with a gear rack 303 disposed on the tracks 302 to move the panel 304 along the tracks 302.

In exemplary embodiments, the first actuator 310 is disposed on the panel 304 and receives electric power and control signals via wires disposed in a wire harness 309, which is affixed to the panel 304. The wire harness 309 is configured to control the movement of the wires during movement of the panel 304 to prevent the wires from being damaged as the panel 304 moves.

In exemplary embodiments, the panel 304 includes one or more sensors 307 that are configured to detect when the panel 304 has reached the end of track 302. In one embodiment, the sensors are limit switches that are connected to a controller (not shown), which controls the operation of the first actuator 310.

The wheelchair lift system 300 also includes a housing 305 disposed on the panel 304. The housing 305 is configured to at least partially enclose the scissor lift mechanism 314 when the scissor lift mechanism 314 is in a collapsed state. The scissor lift mechanism 314 includes a first end that is connected to the housing 305 and a second end that is connected to a platform 320. Both the first end and the second end of the scissor lift mechanism 314 include a fixed attachment point 315 and a slidable attachment point 317, which allow the scissor lift mechanism 314 to expand and collapse, thereby lowering and lifting the platform 320.

In exemplary embodiments, the wheelchair lift system 300 includes a second actuator 316 that is configured to control the operation of the scissor lift mechanism 314. In one embodiment, the second actuator 316 is a linear actuator that is affixed to the housing 305 and affixed to one of the cross members 318 of the scissor lift mechanism 314. In one embodiment, the second actuator 316 is an electrical actuator that is controlled by a controller (not shown).

Referring now to FIG. 3D a schematic diagram illustrating a cross-sectional view of one of the tracks 302 of the wheelchair lift system 300 in accordance with an exemplary embodiment is shown. As illustrated, the track 302 includes a channel 306 configured to receive a wheel of the panel. The track 302 include one or more lips 322 that are configured to prevent the wheels from exiting a top of the channel 306. For example, when the wheelchair lift system 300 is in the position shown in FIGS. 3B and 3C. The track 302 also includes a gear rack 303 that is disposed adjacent to the channel 306. The gear rack 303 is configured to interact with the gear 312.

Figure 4:
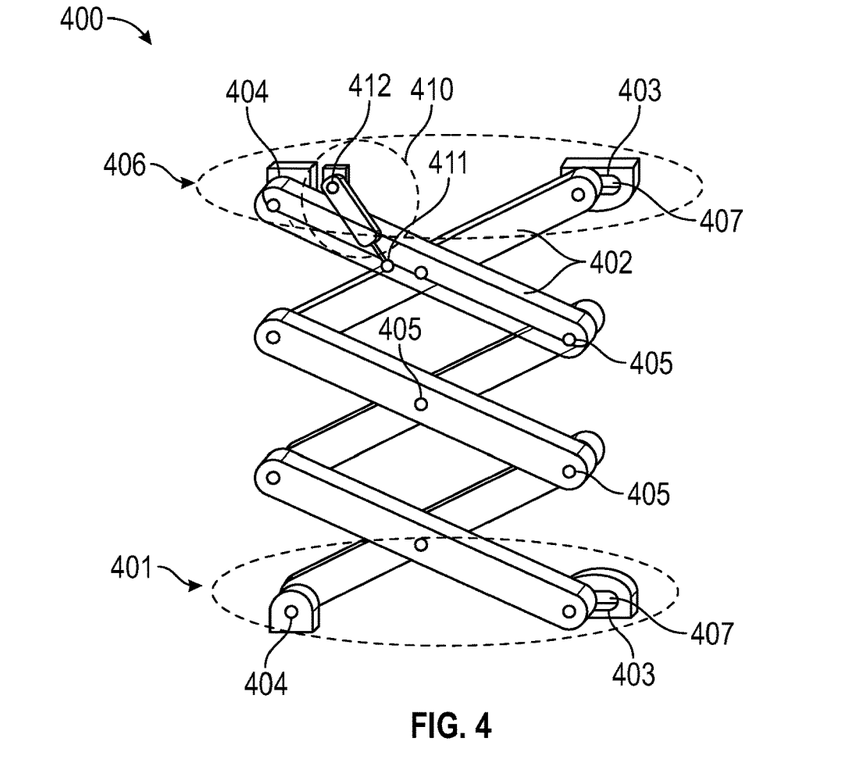
FIG. 4 is a schematic diagram illustrating a scissor lift mechanism in accordance with an exemplary embodiment.

Referring now to FIG. 4, a schematic diagram illustrating a scissor lift mechanism 400 in accordance with an exemplary embodiment is shown. As illustrated, the scissor lift mechanism 400 includes a plurality of cross members 402 that are connected to each other at attachment points 405. The scissor lift mechanism 400 includes a first end 406 that is connected to a panel (not shown) and a second end 401 that is connected to a platform (not shown). Both the first end 406 and the second end 401 include a fixed attachment point 404 and a slidable attachment point 403. The slidable attachment point 403 includes an elongated slot 407 that allows the cross members 402 connected to the slidable attachment point 403 to move laterally so that the scissor lift mechanism 400 can collapse and expand.

The scissor lift mechanism 400 also includes an actuator 410 that is configured to control the operation of the scissor lift mechanism 400. The actuator 410 is a linear actuator that has a first end 412 affixed to the panel (not shown) and a second end 411 affixed to one of the cross members 402. In exemplary embodiments, the actuator 410 includes a force sensor that is configured to monitor the force being exerted by the actuator 410. In exemplary embodiments, the actuator 410 is configured to have a maximum downward force limit and upon a determination that the force being exerted by the actuator 410 has reached the maximum downward force limit, the actuator 410 is configured to stop operations to prevent damage to the scissor lift mechanism 400 or an operator.

Figure 5:
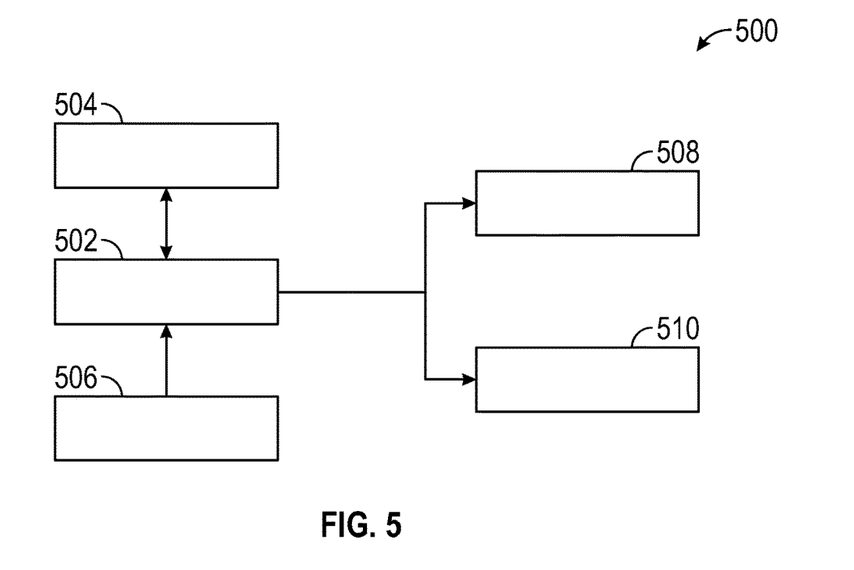
FIG. 5 is a block diagram illustrating a control system for operating a wheelchair lift system on a vehicle in accordance with an exemplary embodiment.

Referring now to FIG. 5, a block diagram illustrating a control system 500 for operating the system for boarding a wheelchair on a vehicle in accordance with an exemplary embodiment is shown. The control system 500 includes a controller 502 that is configured to receive input from a user interface 504 and one or more sensors 506. The controller 502 is one of a general-purpose processor, a Field Programmable Gate Array (FPGA), an application-specific integrated circuit (ASIC), or the like.

In exemplary embodiments, the sensors 506 are configured to monitor a condition of vehicle, including whether a door of the vehicle is in an open or closed position. The sensors 506 are also configured to monitor a relative position of a platform of the wheelchair lift system and a panel of the wheelchair lift system. The sensors 506 are further configured to monitor a relative position of a panel of the wheelchair lift system and the tracks of the wheelchair lift system.

In exemplary embodiments, the user interface 504 is configured to receive command from a user to operate the wheelchair lift system. In one embodiment, the user interface 504 is disposed within the vehicle. For example, the user interface 504 may include one or more buttons or switches disposed inside of the vehicle. In another embodiment, the user interface 504 is disposed on a smartphone of a user, which is in communication with the controller 502.

In exemplary embodiments, the controller 502 is configured to selectively activate the first actuator 508 and the second actuator 510 based on the commands received from the user interface 504 and based on the data received from the sensors 506. For example, the controller 502 is configured to ensure that a door corresponding to the wheelchair lift is in an open position prior to activating the first actuator 508 to extend the panel outside of the interior of the vehicle. In exemplary embodiments, when the controller 502 is not able to perform a command received from the user interface 504, the controller 502 is configured to transmit an error message to the user interface 504, which is in turn displayed to the user. The error message indicates the detected condition that is preventing the received command from being executed, such as the door being in the closed position.

Figure 6A:
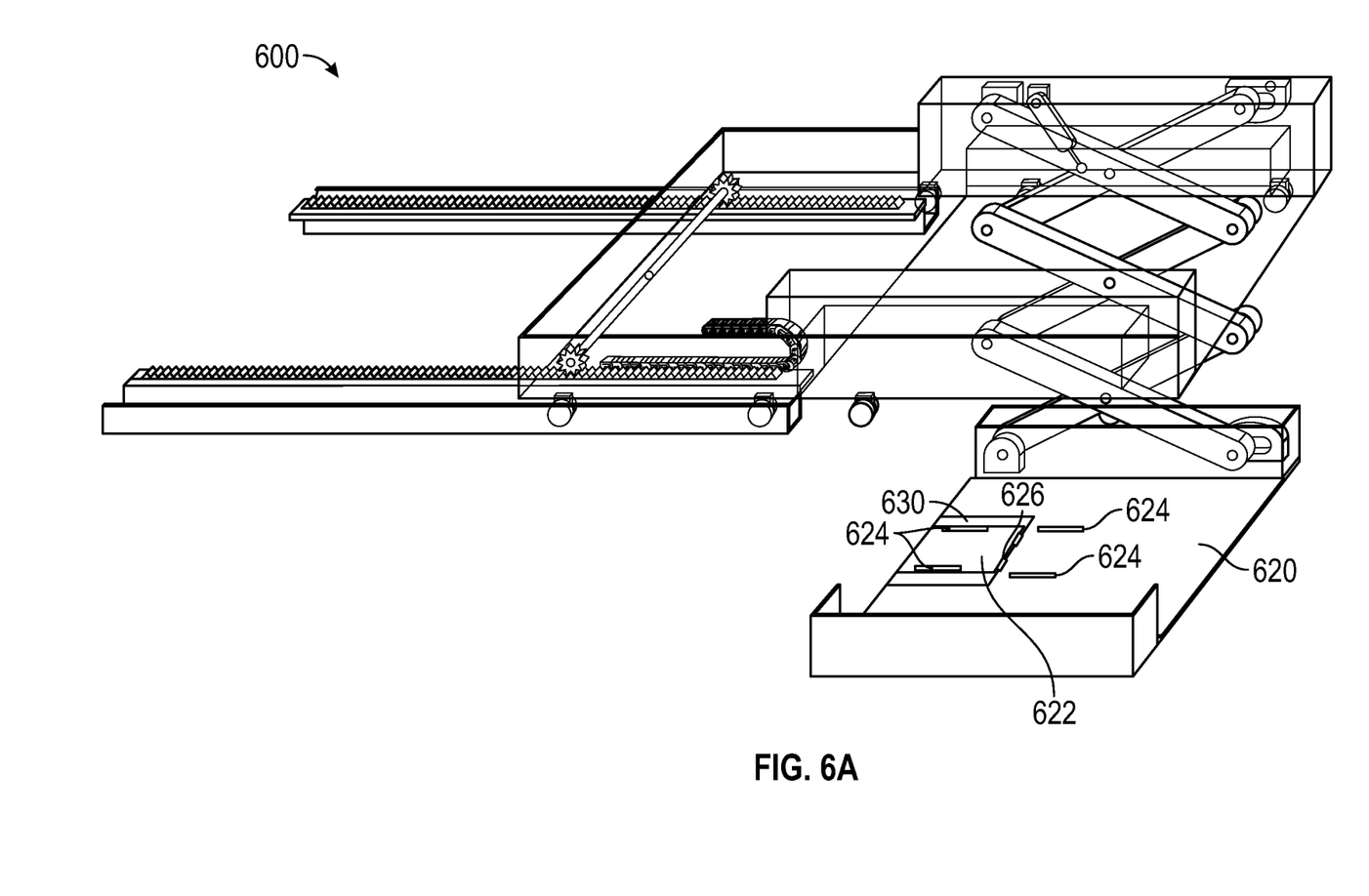
FIGS. 6A and 6B are schematic diagrams illustrating a platform of a wheelchair lift system for a vehicle in accordance with an exemplary embodiment.
Figure 6B:
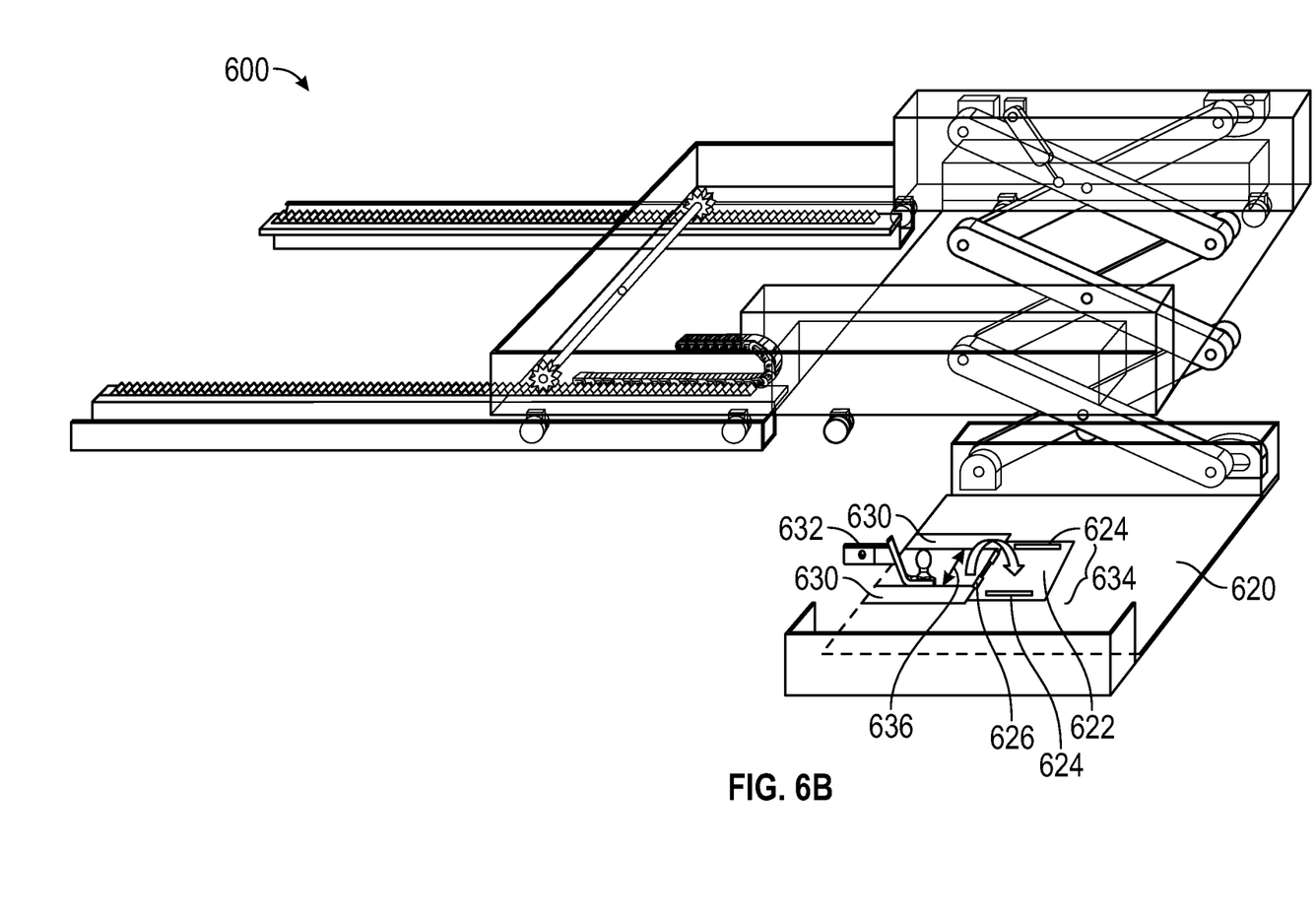

Referring now to FIGS. 6A and 6B, schematic diagrams illustrating a platform 620 of a wheelchair lift system 600 for a vehicle in accordance with an exemplary embodiment are shown. As illustrated, the platform 620 includes a flap 622 portion that is affixed to the platform by a hinge 626. In exemplary embodiments, the flap 622 is configured to pivot about the hinge 626 when the flap 622 encounters a trailer hitch 632 as the platform 620 is being lowered. In exemplary embodiments, the flap 622 has a width 634 that is wider than an opening 636 of the platform 620. Accordingly, when the flap 622 is in a closed position, as shown in FIG. 6A, the flap 622 at least partially overlaps portions 630 of the platform 620. In exemplary embodiments, one or more magnets 624 are disposed on one or more of the flap 622 and the platform 620 to secure the flap 622 in one or more of the open position, as shown in FIG. 6B, or the closed position, as shown in FIG. 6A.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for boarding a wheelchair on a vehicle, the system comprising:
    a pair of tracks affixed to an interior of the vehicle;
    a panel slidably disposed on the pair of tracks;
    a scissor lift mechanism having a first end affixed to the panel;
    a platform configured for receiving the wheelchair, the platform affixed to a second end of the scissor lift mechanism;
    a first actuator configured to move the panel along the pair of tracks; and
    a second actuator configured to operate the scissor lift mechanism; and
    a controller;
    a first sensor configured to detect when the panel has reached a fully-extended position with respect to the tracks;
    a second sensor configured to detect when the platform has returned to a predetermined stow height with respect to the panel;
    wherein the controller is configured to enable operation of the second actuator only after the first sensor detects the panel has reached the fully extended position, and to enable operation of the first actuator to retract the panel only after the second sensor detects the platform has returned to the predetermined stow height;
    wherein the second actuator includes a force sensor configured to monitor the force being exerted by the actuator and to stop operation of the actuator upon reaching a maximum force limit.

2. The system of claim 1, wherein the panel includes one or more wheels and wherein each of the pair of tracks includes a channel that is configured to receive the one or more wheels.

3. The system of claim 1, wherein each of the first end and the second end of the scissor lift mechanism includes both a fixed attachment point and a slidable attachment point.

4. The system of claim 1, wherein the second actuator is a linear actuator.

5. The system of claim 4, wherein a first end of the linear actuator is affixed to the panel and a second end of the linear actuator is affixed to a cross member of the scissor lift mechanism.

6. The system of claim 1, wherein the first actuator is a rotary actuator.

7. The system of claim 6, wherein the first actuator is affixed to a gear that is configured to rotate a rod, the rod having gears disposed on each end.

8. The system of claim 1, wherein the platform further comprises a flap portion affixed to the platform by a hinge, the flap portion being configured to pivot about the hinge between an open position and a closed position.

9. The system of claim 8, wherein the platform and/or the flap portion include one or more magnets configured to secure the flap portion in at least one of the open position or the closed position.

10. The system of claim 1, further comprising a wire harness affixed to the panel, the wire harness configured to control the movement of wires during movement of the panel to prevent the wires from being damaged as the panel moves.

11. A vehicle comprising,
    a door;
    a wheelchair lift disposed in an interior of the vehicle adjacent to the door, the wheelchair lift comprising:
        a pair of tracks affixed to the interior of the vehicle;
        a panel slidably disposed on the pair of tracks;
        a scissor lift mechanism having a first end affixed to the panel;
        a platform configured for receiving a wheelchair, the platform affixed to a second end of the scissor lift mechanism;
        a first actuator configured to move the panel along the pair of tracks; and
        a second actuator configured to operate the scissor lift mechanism;
    a controller;
    a first sensor configured to detect when the panel has reached a fully-extended position with respect to the tracks;
    a second sensor configured to detect when the platform has returned to a predetermined stow height with respect to the panel;
    wherein the controller is configured to enable operation of the second actuator only after the first sensor detects the panel has reached the fully extended position, and to enable operation of the first actuator to retract the panel only after the second sensor detects the platform has returned to the predetermined stow height;
    wherein the second actuator includes a force sensor configured to monitor the force being exerted by the actuator and to stop operation of the actuator upon reaching a maximum force limit.

12. The vehicle of claim 11, wherein the pair of tracks are oriented perpendicular to the door when the door is in a closed position.

13. The vehicle of claim 11, wherein the second actuator is a linear actuator.

14. The vehicle of claim 13, wherein a first end of the linear actuator is affixed to the panel and a second end of the linear actuator is affixed to a cross member of the scissor lift mechanism.

15. The vehicle of claim 11, wherein the first actuator is configured to extend the panel outside of the interior of the vehicle.

16. The vehicle of claim 11, wherein the panel includes one or more wheels and wherein each of the pair of tracks includes a channel that is configured to receive the one or more wheels.

17. The vehicle of claim 11, wherein the platform further comprises a flap portion affixed to the platform by a hinge, the flap portion being configured to pivot about the hinge between an open position and a closed position.

18. The vehicle of claim 17, wherein the platform and the flap portion include one or more magnets configured to secure the flap portion in at least one of the open position or the closed position.

19. The vehicle of claim 11, further comprising a wire harness affixed to the panel, the wire harness configured to control the movement of wires during movement of the panel to prevent the wires from being damaged as the panel moves.

20. A vehicle comprising:
- a door;
- a wheelchair lift disposed in an interior of the vehicle adjacent to the door, the wheelchair lift comprising:
  - a pair of tracks affixed to the interior of the vehicle;
  - a panel slidably disposed on the pair of tracks;
  - a scissor lift mechanism having a first end affixed to the panel;
  - a platform configured for receiving a wheelchair, the platform affixed to a second end of the scissor lift mechanism;
  - a rotary actuator configured to move the panel along the pair of tracks;
  - a linear actuator configured to operate the scissor lift mechanism;
  - one or more sensors configured to monitor one or more of a position of the door, a relative position of the panel and the pair of tracks, and a relative position of the panel and the platform; and
  - a controller configured to operate the linear actuator and the rotary actuator based at least in part on a user command and data received from the one or more sensors, the controller further configured to:
  - enable operation of the linear actuator only after a first sensor detects the panel is fully extended with respect to the tracks;
  - enable operation of the rotary actuator to retract the panel only after a second sensor detects the platform is stowed with respect to the panel;
  - wherein the linear actuator includes a force sensor configured to monitor the force being exerted by the actuator and to stop operation of the actuator upon reaching a maximum force limit.

* * * * *